Nov. 26, 1957     P. TRUJILLO     2,814,152
ROTARY FLY CONTAINER
Filed Oct. 1, 1956
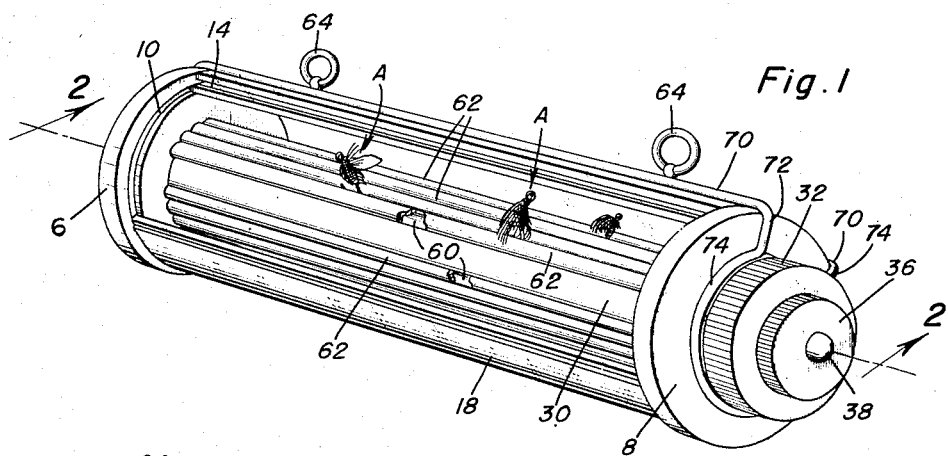
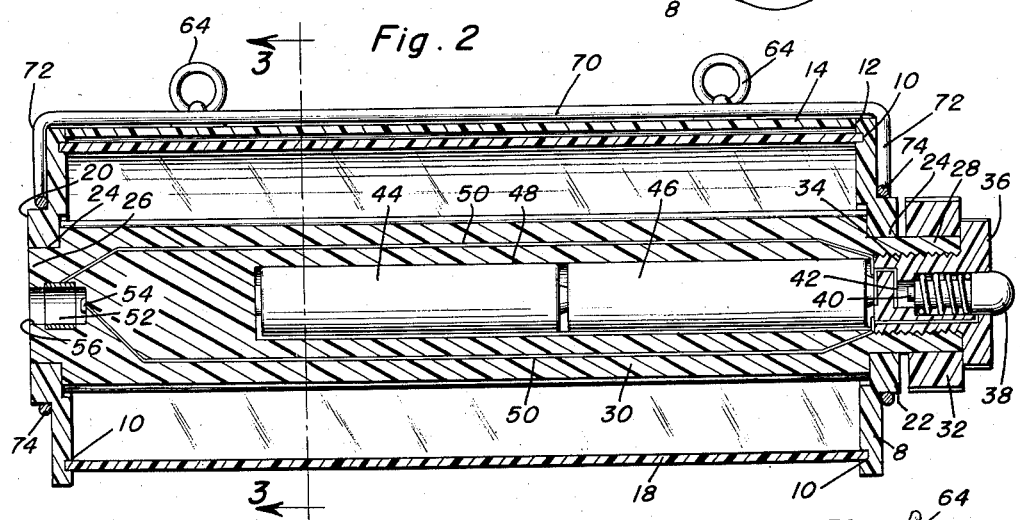
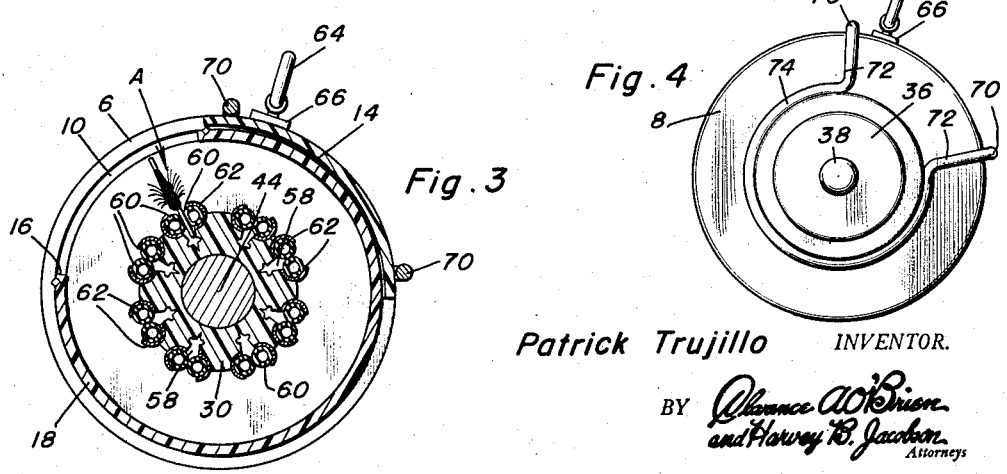
Patrick Trujillo    INVENTOR.

2,814,152
ROTARY FLY CONTAINER

Patrick Trujillo, Casper, Wyo.

Application October 1, 1956, Serial No. 613,205

2 Claims. (Cl. 43—57.5)

The present invention relates to holding and carrying means for a multiplicity of selectively usable fishing flies and has more particular reference to a cylindrical transparent plastic case and a centrally disposed hub-like member mounted for rotation in said case and having means on its peripheral surface by way of which the fishing flies are accessibly held for use.

Another object of the invention is to provide swivelly mounted rings which are attached to the lid or cover portion of the casing and which serve to accommodate a ribbon, cord or the like which enables the device to be handily suspended from the shoulder or hung around the neck, whichever is preferred.

Another object of the invention has to do with a transparent plastic case which encases the aforementioned turnable hub and wherein the surface of said hub is provided with paired plastic tubular members which constitute means for anchoring of the hooked ends of the flies thereon making it possible to select the flies, remove the same or return them to their intended retained positions.

Then, too, novelty is predicated on a hub member which has the additional function of a flashlight battery in that it has socket means in one end containing dry cells, is provided with a suitable circuit make and break switch and is provided at its opposite end with an appropriate socket to accommodate a flashlight bulb whereby to thus incorporate the flashlight as a component of the over-all invention.

Other objects, features and advantages will become more readily apparent from the following description and the accompanying sheet of drawings.

In the drawings:

Fig. 1 is a perspective view of a rotary fly container constructed in accordance with the invention and showing the slotted cylindrical body in open position;

Fig. 2 is a section on an enlarged scale taken on the plane of the line 2—2 of Fig. 1;

Fig. 3 is a cross-section on the line 3—3 of Fig. 2; and

Fig. 4 is an end elevation observing the structure of Figs. 1 and 2 in a direction from right to left.

Referring now to the drawings, attention is first directed to a pair of spaced parallel disk-like heads or end members 6 and 8 having endless track-like grooves 10 in their opposed inner surfaces as shown. Having its transverse end portions fixed, as at 12 to the outer marginal edge portions of the two heads is a sector-shaped arcuate plastic panel 14 which here provides what is conveniently referred to as a lid or cover, that is, for the correspondingly proportioned entrance opening 16 of the three-quarter cylindrical body 18. This might perhaps also be described as a barrel and, obviously, the end portions thereof are fitted into and rotatable in the grooves 10. Assuming then that the lid or cover 14 and the two end heads are one unit and the body is another, one can appreciate that the body is turned relative to the heads or that it is possible to hold the body and turn the heads and cover relative thereto in order to open and close the entrance opening 16.

It will be noticed that the outer central portions of the respective heads are formed with what may be called outstanding bosses 20 and 22 and these provide bearings 24 for the journal-like end portions 26 and 28 of the hub member 30. This hub member has its main portion interposed between the inner surfaces of the heads 6 and 8, as shown in Fig. 2, with the journals extending sufficiently into the bearings to permit the hub member to be manually rotated. It will be noticed that the journal or extension 28 at the right has a knurled finger-grip or knob 32. It is also internally screw-threaded and a screw-threaded sleeve 34 is threaded into it, the sleeve being provided at its outer end with a finger-grip or knob 36. The sleeve provides a socket for the spring returned push-button 38 having a contact 40 engageable with the relatively stationary contact 42 which serves to close the circuit including the dry cells 44 mounted in the socket 48 provided therefor in the stated hub member. The conductors 50 extend lengthwise of the hub member and join with the contacts 52 and 54 which serve to accommodate an insertable and removable flashlight bulb (not shown). That is to say, a socket is provided at 56 and the contacts 52 and 54 are located in the socket and therefore means is provided for attachment of the aforementioned flashlight bulb. It follows that this rotatable hub member 30 therefore constitutes a handy flashlight which is built into and constitutes a part of the over-all fly container and protector. The main purpose of the hub member insofar as it relates to the fly holding means is that it provides a mount for the flies A as shown in Fig. 3. More specifically, the periphery or surface of the hub member is provided with lengthwise grooves 58 which serve as clearance pockets for the hooked end portions of the flies A. In other words, the hooks are extended into these pockets and extending along the opposite longitudinal edge portions of the pockets are elastic tubular grips 60 which are held in place by semi-circular metal channel members 62. These channel members are located on the respective opposite edges of the grooves 58 and they have half-portions embedded in the plastic material from which the member 30 is formed as brought out in Fig. 3. In other words, along opposite edges of the grooves 58 are these anchored channel members 62 facing each other and they serve as devices which place and hold the tubes 60 whereby to thus provide satisfactory yieldable grips for the hooked ends of the flies. The journals and knob means seen in Fig. 2 make it possible to turn the entire hub throughout a circle so that any group or batch of flies may be brought into registry with the opening 16 and thus selected and used.

As before mentioned, swivel eyes are provided and these are denoted by the numerals 64 and they are fixedly anchored at 66 on the convex surface of the aforementioned cover or lid 14 as brought out in Fig. 3. These are longitudinally spaced and are adapted to accommodate ribbons or neck cords (not shown) whereby the device may be suspended handily and then the tubular body 18 caught hold of and turned around in the channel-like tracks 10 to bring the opening means 16 to a handy position exposing the hub means. Once this is accomplished the hub means may be turned relative to the body 18 and heads 6 and 8 to choose, remove or replace the flies.

In order to strengthen the part of the assembly comprising the two heads 6 and 8 and the intervening cover 14 a wire rigidifying frame is used. This has sometimes been referred to as a wire bail. In any event, it embodies a pair of U-shaped portions which are in spaced parallelism and each of which includes a bight portion 70 and lateral end portions 72. The lateral end portions connect with substantially C-shaped end members 74 which are clamped tightly around the boss-like extensions 20 and 22. In other words, the two head members 6 and 8 in conjunction with the reinforcing wire frame provide a lightweight but rigid structure in which the parts are relatively movable in desired relationship to facilitate inserting, removing and otherwise accessibly handling the fishing flies.

Since numerous modifications and changes will readily occur to those skilled in the art, it is not desired to limit the invention to the exact construction and operation shown and described, and accordingly, all suitable modifications and squivalents may be resorted to, falling within the scope of the invention as claimed.

What is claimed as new is as follows:

1. A holder for fishing flies comprising a pair of aligned spaced parallel heads provided centrally with bearings and having endless grooves on their inner faces providing tracks, a relatively stationary arcuate panel having its end portions interposed between the respective heads and secured thereto and serving as a closure, an open-ended cylindrical casing body having its end portions mounted for rotation in the respective grooves in said heads, the slotted portion thereof cooperating with said panel and the panel serving as a closure therefor, and a hub-like member located in said casing and having journals at its ends mounted for rotation in the respective bearings and means on the surface of said hub-like member whereby fishing flies may be removably mounted thereon, said means comprising pairs of elongate elastic tubes and retaining channels therefor, said channels being affixed to the surface of said hub-like member.

2. A holder and protector for fishing flies comprising a casing having a slot permitting access to be had to the interior thereof and also having means whereby the slot may be opened and closed, a hub-like member having its end portions provided with journals and journaled for rotation in bearings provided therefor in the end portions of said casing, said hub-like member being provided with pairs of lengthwise gripping elements and associated clearance slots registrable with said elements whereby to permit the hooked ends of the flies to be passed and held between the respective gripping elements and partly pocketed in said grooves, said elements being elastic tubes, and the surface of the hub-like member being provided with elongated spaced parallel channel-like members which serve to anchor and hold said tubes in place but allow the tubes to be replaced whenever necessary or desired.

References Cited in the file of this patent

UNITED STATES PATENTS

| | | |
|---|---|---|
| 2,225,309 | Lawrence | Dec. 17, 1940 |
| 2,382,538 | Biller | Aug. 14, 1945 |
| 2,690,216 | Scott | Sept 28, 1954 |